Jan. 8, 1946.　　　G. H. BARROWS　　　2,392,451
FRUIT PITTER
Filed July 3, 1944
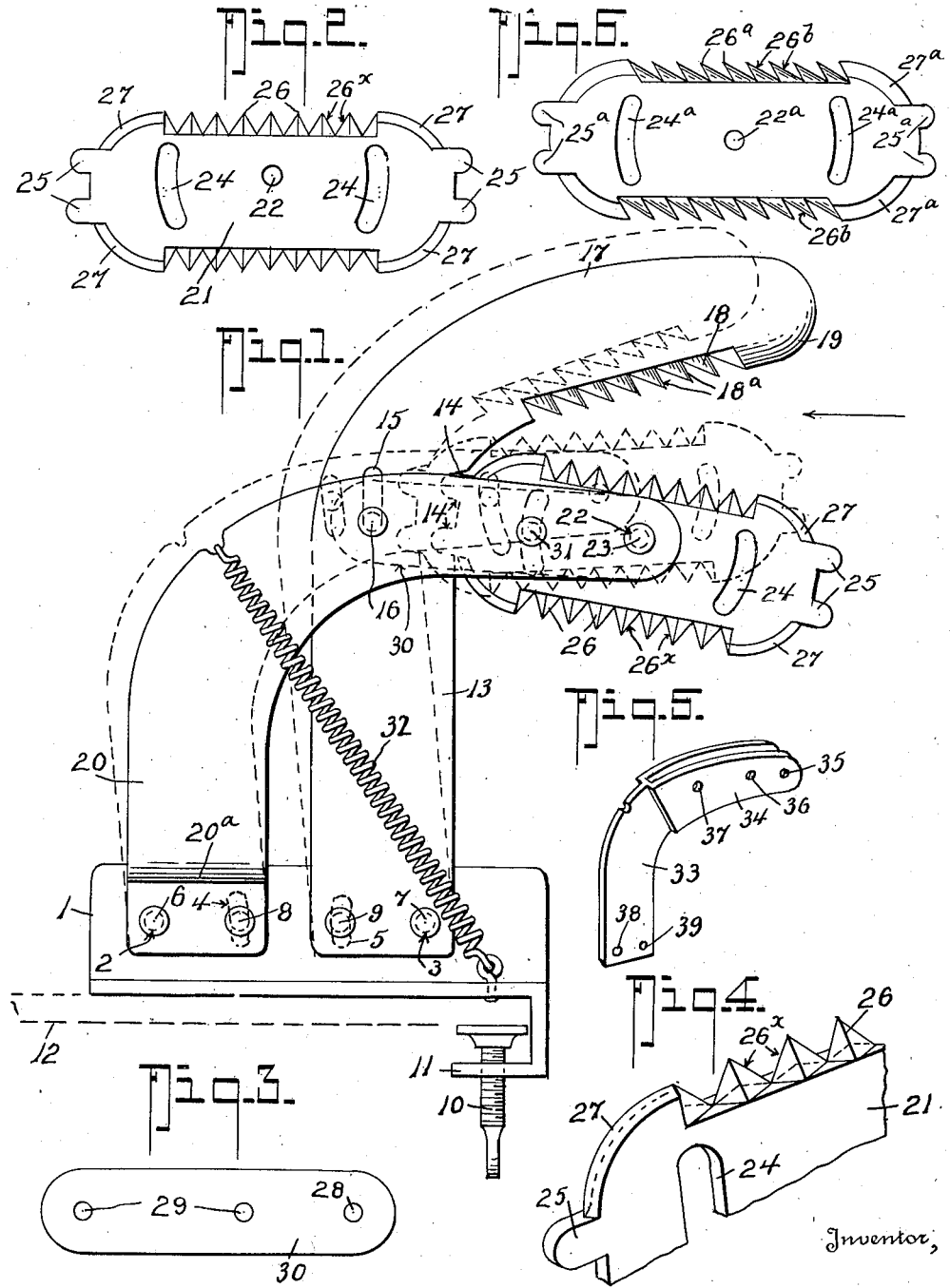
Inventor,
George H. Barrows,
By Albert F. Dieterich,
Attorney.

Patented Jan. 8, 1946

2,392,451

UNITED STATES PATENT OFFICE 2,392,451

FRUIT PITTER

George H. Barrows, Hillsboro, Oreg.

Application July 3, 1944, Serial No. 543,332

11 Claims. (Cl. 146—28)

My invention relates to devices for halving peaches, apricots, etc., and removing the stones therefrom.

Primarily the invention has for its object to provide a simple, portable machine or device for the purpose stated which can be manufactured at low cost, one which will effectively and rapidly serve its intended purposes.

Again it is an object to provide a fruit pitter that is operated by the one simple act of putting the fruit into the jaws of the device.

Other objects will in part be obvious and in part will be pointed out hereinafter.

To the attainment of the aforesaid objects and ends the invention further resides in the novel combinations, arrangements of parts and details of construction which will be first described in detail and then be specifically pointed out in the appended claims, reference being had to the accompanying drawing in which:

Fig. 1 is a side elevation of my invention.

Fig. 2 is an elevation of the blade shown in Fig. 1.

Fig. 3 is an elevation of the back link.

Fig. 4 is a detail perspective view of a portion of the blade shown in Figs. 1 and 2 showing the pyramid teeth.

Fig. 5 is a detail perspective view of a modified blade-carrying arm.

Fig. 6 is an elevation of another form of blade that may be used in place of the blade shown in Figs. 1 and 2.

In the drawing in which like numerals and letters of reference indicate like parts in all the figures, 1 represents a bracket base on which the blade-carrying arm 20 and the toothed-jaw arm 13 are pivoted at 6 and 7 respectively. The bracket has an extension with a lug 11 through which a clamping screw 10 is threaded so as to enable the implement to be mounted on a table 12 or other stationary support. The bracket has holes 2 and 3 for the rivets or bolts 6 and 7 respectively, and slots 4 and 5 for the rivets or bolts 8 and 9 respectively.

The arm 13 is curved, as at 17, and has forwardly pointed teeth 18 of triangular form in cross section to present front sharp cutting edges 18ª. The nose of the curved part 17 is sharpened as at 19 to serve as a knife or cutter. The arm 13 is also provided with notches or recesses 14 to receive the teats 25 of the cutter blade 21 loosely. The arm 13 also has a slot 15 through which a rivet or bolt 16, carried by the blade-carrying arm passes.

The blade-carrying arm 20 is offset as at 20ª so that its curved portion 20ᵇ will lie against the side of the arm 13 below the curved part 17 thereof. The arm 20 and a plate 30 located at the side of arm 13 opposite that against which arm portion 20ᵇ lies, carry three spaced apart rivets or bolts 16, 31 and 23. The rivet or bolt 23 passes through a pivot hole 22 (or 22ª as the case may be) in the blade and constitutes a pivot therefor. The rivet or bolt 31 passes through one of the slots 24 (or 24ª) in the blade while the rivet or bolt 16 passes through the slot 15 in arm 13 as best shown in Fig. 1. The plate 30 has rivet receiving holes 28 and 29 as shown.

The blade used may be constructed as shown in Fig. 2 or as shown in Fig. 6. When constructed as shown in Figs. 1 and 2, the pivot hole 22 is off center, thereby providing for operating on small fruit or large fruit as desired, the blade being reversible. As shown in Fig. 1 the blade is set for large fruit. The blade of Fig. 2 has pyramid teeth 26 providing two cutting edges 26ˣ to each tooth. When one edge gets dull the blade can be reversed to present the other edge to the fruit. The four rounded "corners" of the blade are also sharpened to a knife edge as at 27. When constructed as shown in Fig. 6 the teeth 26ª of the blade slant backwardly, the edges 26ᵇ of the teeth being the sharp edges presented to the fruit. In Fig. 6 those parts of the blade which correspond to similar or like parts in Fig. 2 bear the same reference number plus the index letter a making it unnecessary further to described the blade of Fig. 6.

A return spring 32 is anchored to the arm 20 and to the base 1 as shown.

In Fig. 6 is shown a modified form of blade-carrying arm. The arm 33 in this modification has its curved part bifurcated so as to straddle the arm 13 and by this construction the use of a plate 30 and offset 20ª is avoided. The arm 33 has rivet or bolt holes 35, 36, 37, 38 and 39 as shown.

Operation

Assume the parts to be positioned as shown in full lines in Fig. 1. The operator grasps the fruit, say a peach or apricot in both hands and presents it to the machine in the direction of the arrow in Fig. 1. The cutting edges 19 and 27 begin to divide the fruit. As soon as the stone engages the blade and jaw teeth the arms 13 and 20 are tilted on their pivots 7 and 6 respectively toward the dotted line position shown in that figure. As the arms are tilted the blade is given a somewhat rotary movement on the pivot 23 and the blade is brought closer to the teeth 18. Consequently the teeth not only continue the cutting action on the fruit but also grip the stone. As soon as the stone is gripped the operator gives the fruit a slight turn or twist to free it from the stone whereupon the spring 32 restores the parts to the full line position again and releases the stone.

When using the blade of Fig. 6 it is placed on the blade-carrying arm 20 with the teeth 26 pointed toward the arm 13, consequently, when pitting the fruit, the tendency of the blade is to draw the fruit and stone into the jaws.

While I have shown a preferred form of my invention in the drawing, I wish it understood that changes in the details of construction can be made without departing from the invention within the scope of the appended claims.

From the foregoing description taken in connection with the accompanying drawing it is thought the construction, operation and advantages will be clear to those skilled in the art.

What I claim is:

1. In a fruit pitter: a support; a toothed-jaw arm rockably mounted on said support; a blade-carrying arm also rockably mounted on said support; a pin-and-slot connection between said arms; a toothed blade carried by said blade-carrying arm for cooperation with the toothed portion of said toothed-jaw arm to cut the fruit and grip the stone as the arms are rocked from a first position to a second position.

2. In a fruit pitter: a support; a toothed-jaw arm rockably mounted on said support; a blade-carrying arm also rockably mounted on said support; a pin-and-slot connection between said arms; a toothed blade rockably carried by said blade-carrying arm for cooperation with the toothed portion of said toothed-jaw arm to cut the fruit and grip the stone as the arms are rocked from a first position to a second position.

3. In a fruit pitter: a support; a toothed-jaw arm rockably mounted on said support; a blade-carrying arm also rockably mounted on said support; a pin-and-slot connection between said arms; a toothed blade carried by said blade-carrying arm for cooperation with the toothed portion of said toothed-jaw arm to cut the fruit and grip the stone as the arms are rocked from a first position to a second position; and means continuously tending to restore said arms to said first position.

4. In a fruit pitter: a support; a toothed-jaw arm rockably mounted on said support; a blade-carrying arm also rockably mounted on said support; a pin-and-slot connection between said arms; a toothed blade rockably carried by said blade-carrying arm for cooperation with the toothed portion of said toothed-jaw arm to cut the fruit and grip the stone as the arms are rocked from a first position to a second position; and means continuously tending to restore said arms to said first position.

5. In a fruit pitter: a support; a toothed-jaw arm; a pivotal connection between said arm and said support; means cooperating with said support for limiting the movement of said arm on its pivot; a blade-carrying arm; a pivotal connection between said blade-carrying arm and said support; means cooperating with said support for limiting the movement of said blade-carrying arm on its pivot; a toothed blade pivotally carried by said blade-carrying arm; means rockably engaging one end of said blade with said toothed-jaw arm; means operatively connecting said toothed-jaw arm to said blade-carrying arm by virtue of which movement of said toothed-jaw arm will be imparted to said blade-carrying arm and vice-versa; and means continuously tending to move said arms to a non-operative position.

6. As a new article of manufacture: a blade for fruit pitters including a flat elongated plate with sharp cutting ends from which at least one ear projects and including at least one row of pyramidal teeth along a longitudinal edge; said plate having a pivot hole and slots spaced from said hole for purposes described.

7. As a new article of manufacture: a blade for fruit pitters which comprises an elongated flat plate having rounded ends sharpened to knife edge and having along each longitudinal edge a row of teeth, said plate having a pivot receiving hole, and guide slots at either side of said hole.

8. As a new article of manufacture: a blade for fruit pitters which comprises an elongated flat plate having rounded ends sharpened to knife edge and having along each longitudinal edge a row of teeth, said plate having a pivot receiving hole, the teeth of said plate being pyramidal in form.

9. As a new article of manufacture: a blade for fruit pitters which comprises an elongated flat plate having rounded ends sharpened to knife edge and having along each longitudinal edge a row of teeth, said plate having a pivot receiving hole, and guide slots at either side of said hole, the teeth of said plate being pyramidal in form.

10. As a new article of manufacture: a blade for fruit pitters which comprises an elongated flat plate having rounded ends sharpened to knife edge and having along each longitudinal edge a row of teeth, said plate having a pivot receiving hole, the teeth of said plate being slanted toward an end of the plate.

11. As a new article of manufacture: a blade for fruit pitters which comprises an elongated flat plate having rounded ends sharpened to knife edge and having along each longitudinal edge a row of teeth, said plate having a pivot receiving hole; and guide slots at either side of said hole; the teeth of said plate being slanted toward an end of the plate.

GEORGE H. BARROWS.